(12) United States Patent
Liang et al.

(10) Patent No.: US 11,894,583 B2
(45) Date of Patent: Feb. 6, 2024

(54) BOX BODY APPLIED TO BATTERY, BATTERY ASSEMBLY, ELECTRIC APPARATUS, AND METHOD AND DEVICE FOR PREPARING BATTERY ASSEMBLY

(71) Applicant: JIANGSU CONTEMPORARY AMPEREX TECHNOLOGY LIMITED, Changzhou (CN)

(72) Inventors: Chengdu Liang, Changzhou (CN); Jiarong Hong, Changzhou (CN); Xiaoteng Huang, Changzhou (CN); Wenli Wang, Changzhou (CN); Haiqi Yang, Changzhou (CN); Langchao Hu, Changzhou (CN); Chenyi Xu, Changzhou (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 0 days.

(21) Appl. No.: 18/054,314

(22) Filed: Nov. 10, 2022

(65) Prior Publication Data
US 2023/0084044 A1    Mar. 16, 2023

Related U.S. Application Data

(63) Continuation of application No. PCT/CN2020/121996, filed on Oct. 19, 2020.

(51) Int. Cl.
*H01M 50/691* (2021.01)
*H01M 10/613* (2014.01)
(Continued)

(52) U.S. Cl.
CPC ..... *H01M 50/691* (2021.01); *H01M 10/0404* (2013.01); *H01M 10/613* (2015.04);
(Continued)

(58) Field of Classification Search
CPC .. H01M 50/691; H01M 50/24; H01M 50/682; H01M 50/271; H01M 10/613; H01M 10/625; H01M 10/0404
See application file for complete search history.

(56) References Cited

U.S. PATENT DOCUMENTS

| 10,236,488 | B2 | 3/2019 | Li |
| 2015/0236314 | A1 | 8/2015 | Lee et al. |
| 2017/0256764 | A1 | 9/2017 | Li |

FOREIGN PATENT DOCUMENTS

| CN | 203910893 U | 10/2014 |
| CN | 105762428 A | 7/2016 |

(Continued)

OTHER PUBLICATIONS

The World Intellectual Property Organization (WIPO) International Search Report and Written Opinion for PCT/CN2020/121996 dated Jul. 22, 2021 16 pages (including Translation).

(Continued)

*Primary Examiner* — Jimmy Vo
(74) *Attorney, Agent, or Firm* — ANOVA LAW GROUP, PLLC

(57) ABSTRACT

A box body includes a carrying plate configured to carry a battery and a one-way gravity valve disposed at the carrying plate. The one-way gravity valve is configured to be closed in response to a gravity of liquid in the box body being less than a threshold, and to be open in response to the gravity of the liquid in the box body reaching the threshold.

19 Claims, 12 Drawing Sheets

(51) Int. Cl.
    *H01M 10/625*     (2014.01)
    *H01M 50/24*     (2021.01)
    *H01M 50/682*     (2021.01)
    *H01M 50/271*     (2021.01)
    *H01M 10/04*     (2006.01)

(52) U.S. Cl.
    CPC ......... *H01M 10/625* (2015.04); *H01M 50/24* (2021.01); *H01M 50/271* (2021.01); *H01M 50/682* (2021.01); *H01M 2220/20* (2013.01)

(56) References Cited

FOREIGN PATENT DOCUMENTS

| CN | 207250619 U | * | 4/2018 | | |
|---|---|---|---|---|---|
| CN | 207250619 U | | 4/2018 | | |
| CN | 207441762 U | * | 6/2018 | | |
| CN | 207441762 U | | 6/2018 | | |
| CN | 207441811 U | * | 6/2018 | | |
| CN | 207441811 U | | 6/2018 | | |
| CN | 111584792 A | | 8/2020 | | |
| JP | 2012094313 A | | 5/2012 | | |
| JP | 2013086641 A | | 5/2013 | | |
| JP | 2016062712 A | | 4/2016 | | |
| JP | 2019185970 A | | 10/2019 | | |
| WO | 2006098130 A1 | | 9/2006 | | |
| WO | WO-2010064255 A1 | * | 6/2010 | ............ | H01M 10/12 |

OTHER PUBLICATIONS

The China National Intellectual Property Administration (CNIPA) The First Office Action for Chinese Application 202011121538.X dated Dec. 7, 2020 14 Pages (including Translation).

Kaizheng Zhang, Research and Application of Industrial Production Technology for Qiang Smack Wine, Published by Sichuan University Press. 5.8.6: Auxiliary equipment for sterilizer, Jul. 31, 2018, p. 47. ISBN: 978-7-5690-1415-0.

The European Patent Office (EPO) The Extended European Search Report for 20957976.2 dated Aug. 24, 2023 9 Pages.

The Japan Patent Office (JPO) Notification of Reasons for Refusal for Application No. 2022-567658 dated Dec. 11, 2023 6 Pages (including translation).

* cited by examiner

A-A

BOX BODY APPLIED TO BATTERY, BATTERY ASSEMBLY, ELECTRIC APPARATUS, AND METHOD AND DEVICE FOR PREPARING BATTERY ASSEMBLY

CROSS-REFERENCE TO RELATED APPLICATIONS

This application is a continuation of International Application No. PCT/CN2020/121996, filed on Oct. 19, 2020, the entire content of which is incorporated herein by reference.

TECHNICAL FIELD

This application relates to the field of battery technologies, and in particular, to a box body applied to battery, a battery assembly, an electric apparatus, and a method and device for preparing battery assembly.

BACKGROUND

As an important new power source, batteries have received ever-increasing attention. Due to temperature changes of the batteries during use, the batteries in the existing technologies are usually equipped with thermal management components for cooling or heating the batteries. During cooling of the battery by using the thermal management component, all components in contact with the thermal management component in a box body produce a condensate, and the condensate comes in contact with an electric structure in the box body and then causes a short circuit.

Therefore, a box body structure capable of preventing the condensate from causing short circuits of the battery needs to be designed, so as to improve safety performance of the battery.

SUMMARY

This application provides a box body applied to battery, a battery, an electric apparatus, and a method and device for preparing battery, so as to prevent short circuits of a battery caused by a condensate.

A first aspect of this application provides a box body applied to battery, including:
  a carrying plate, configured to carry a battery; and
  a one-way gravity valve, disposed at the carrying plate; where
  the one-way gravity valve is configured to be closed when a gravity of liquid in the box body is less than a threshold, and to be open when the gravity of the liquid in the box body reaches the threshold, so as to discharge the liquid through the one-way gravity valve.

In some embodiments, the one-way gravity valve includes:
  a liquid discharge member, provided with a first through hole, where the liquid discharge member is configured to discharge the liquid through the first through hole when the gravity of the liquid in the box body reaches the threshold; and
  a movable assembly, installed at the liquid discharge member and capable of moving relative to the first through hole, so that the movable assembly seals the first through hole when the gravity of the liquid in the box body is less than the threshold, and opens the first through hole when the gravity of the liquid in the box body reaches the threshold.

In some embodiments, a bottom plate is further included and is configured to connect to the carrying plate to form a water storage chamber, where the water storage chamber communicates with the first through hole, so as to collect the liquid discharged from the first through hole.

In some embodiments, a first wall is further included and is configured to connect to the carrying plate to form an accommodating chamber for accommodating the battery, where the first wall is provided with a liquid discharge hole, and the liquid discharge hole is configured to discharge liquid exceeding a height of the liquid discharge hole when a height of a liquid surface of the liquid in the box body in a direction of gravity is greater than or equal to that of the liquid discharge hole.

In some embodiments, the first wall includes a first sub-wall and a second sub-wall, a hollow chamber is formed between the first sub-wall and the second sub-wall, the first sub-wall is an inner wall of the box body, the second sub-wall is an outer wall of the box body, and the first sub-wall is provided with the liquid discharge hole, so that the liquid whose height of the liquid surface in the direction of gravity is greater than or equal to that of the liquid discharge hole is collected in the hollow chamber.

In some embodiments, the first wall further includes a vent hole, and the vent hole is configured to communicate with the inside and the outside of the box body; and the box body further includes a condensing part, configured to block the vent hole, so as to condense gas flowing into the inside of the box body through the vent hole.

In some embodiments, the condensing part is provided at an inner surface of the box body.

In some embodiments, the box body further includes a thermal management component, the thermal management component is configured to adjust a temperature of the battery, the thermal management component intersects the first wall, a first portion of the condensing part extends along the thermal management component, so as to be attached to the thermal management component, and a second portion of the condensing part extends along the first wall to block the vent hole.

In some embodiments, the condensing part includes a cover structure, and the cover structure blocks the vent hole.

In some embodiments, the cover structure is attached to a region of the first wall that surrounds the vent hole, and is provided with a first opening through which gas flows into the box body.

In some embodiments, the first opening is provided in a first direction of the cover structure, and the first direction is a direction opposite the direction of gravity.

In some embodiments, the first opening is further configured to collect fluid leaked from a joint of a pipe of the fire prevention system in a case of fluid leakage at the joint.

In some embodiments, a projection of the cover structure on the first wall is a U-shaped area, a V-shaped area, or a rectangular area.

In some embodiments, the condensing part further includes a flow channel, and the flow channel is configured to guide a condensate on the cover structure to the one-way gravity valve.

In some embodiments, portions of the condensing part on two sides of the flow channel are attached to the first wall.

In some embodiments, the cover structure is provided with a second opening corresponding to the flow channel, and the second opening is configured to guide the condensate on the cover structure to the flow channel.

In some embodiments, the second opening is provided in a second direction of the cover structure, and the second direction is the direction of gravity.

In some embodiments, the one-way gravity valve is further configured to discharge the condensate out of the box body from the flow channel when a gravity of the condensate in the flow channel reaches the threshold.

In some embodiments, the box body further includes a pressure balance mechanism, configured to balance pressure inside and outside the box body.

In some embodiments, the pressure balance mechanism is provided at the second sub-wall, and gas flowing from outside the box body to the hollow chamber through the pressure balance mechanism flows into the box body through the vent hole.

In some embodiments, the box body further includes a liquid storage member disposed at the inner surface of the box body, and the liquid storage member is configured to, when the height of the liquid surface of the liquid in the box body in the direction of gravity reaches a height of the liquid storage member, store liquid that flows into the liquid storage member, and discharge the liquid flowing into the liquid storage member to the one-way gravity valve.

A second aspect of this application provides a battery assembly, including the foregoing box body, where the box body is configured to accommodate the battery.

A third aspect of this application provides an electric apparatus, including the foregoing battery assembly, where the battery is configured to supply electrical energy.

A fourth aspect of this application provides a method for preparing battery assembly, including:
 installing a battery on a carrying plate; and
 disposing a one-way gravity valve on the carrying plate; where
 the one-way gravity valve is configured to be closed when a gravity of liquid in the box body is less than a threshold, and to be open when the gravity of the liquid in the box body reaches the threshold, so as to discharge the liquid through the one-way gravity valve.

A fifth aspect of this application provides a device for preparing battery assembly, including:
 a first apparatus, configured to install a battery on a carrying plate; and
 a second apparatus, configured to dispose a one-way gravity valve on the carrying plate; where
 the one-way gravity valve is configured to be closed when a gravity of liquid in the box body is less than a threshold, and to be open when the gravity of the liquid in the box body reaches the threshold, so as to discharge the liquid through the one-way gravity valve.

The box body applied to battery according to the embodiments of this application is provided with the one-way gravity valve, and a time for discharging the liquid in the box body is determined based on the threshold of the one-way gravity valve. When there is excessive liquid in the box body, the liquid in the box body can be discharged in a timely manner, so as to avoid holding up excessive liquid in the box body for a long time and reduce safety hazards such as short circuits and improving service life of the battery. When there is a relatively small amount of liquid in the box body that is not enough to open the one-way gravity valve, the small amount of liquid in the box body can play a role of cooling the battery inside the box body under the premise of not affecting safety performance of the battery.

BRIEF DESCRIPTION OF DRAWINGS

To describe the technical solutions in the embodiments of this application, the following briefly describes the accompanying drawings used for describing the embodiments. Apparently, the accompanying drawings in the following description show some embodiments of this application, and persons of ordinary skill in the art may derive other drawings from these accompanying drawings without creative efforts.

The accompanying drawings described herein are intended for better understanding of this application, and constitute a part of this application. Exemplary embodiments and descriptions thereof in this application are intended to interpret this application and do not constitute any improper limitation on this application.

DESCRIPTION OF EMBODIMENTS

Figure 1A:
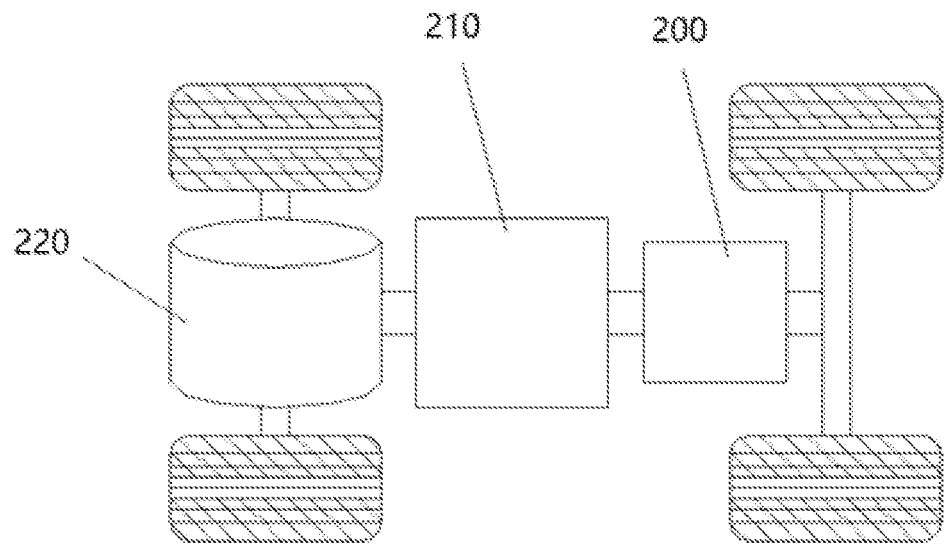
FIG. 1A is a schematic structural diagram of an electric apparatus according to an embodiment of this application.

To make the objectives, technical solutions, and advantages of this application clearer and more comprehensible, the following further describes this application in detail with reference to the accompanying drawings and embodiments. It should be understood that the specific embodiments described herein are merely intended to explain this application, and are merely examples of embodiments of this application, but are not intended to limit the protection scope of this application. All equivalent changes made based on structures, shapes, and principles of this application shall fall within the scope of this application.

Unless otherwise defined, all technical and scientific terms used herein shall have the same meanings as commonly understood by those skilled in the art to which this application belongs. The terms used in the specification of this application are merely intended to describe the specific embodiments but not intended to constitute any limitation on this application. The terms "include", "have" and any other variants in the specification, claims, and description of accompanying drawings of this application mean to cover the non-exclusive inclusion.

The term "embodiment" described herein means that specific features, structures, or characteristics in combination with descriptions of the embodiments may be incorporated in at least one embodiment of this application. The word "embodiment" appearing in various locations in the specification does not necessarily mean a same embodiment, and is neither an independent or alternative embodiment mutually exclusive with other embodiments. Persons skilled in the art explicitly and implicitly understand that the embodiments described herein may combine with another embodiments.

The term "and/or" in this specification describes only an association relationship for describing associated objects and represents that three relationships may exist. For example, A and/or B may represent the following three cases: A alone, both A and B, and B alone. In addition, the character "/" in this specification generally indicates that associated objects are in an "or" relationship.

In addition, the terms "first", "second" and the like in the specification, claims or description of accompanying drawings of this application are used to distinguish between different objects but not describe a specific sequence, and can explicitly or implicitly include one or more features.

In the descriptions of this application, unless otherwise specified, "a plurality of" means two or more than two. Similarly, "a plurality of" groups of means two or more than two groups.

In the descriptions of this application, it should be noted that, unless otherwise specified and defined explicitly, the terms "mounting", "interconnection", and "connection" should be understood in a broad sense. For example, the "interconnection" or "connection" of a mechanical structure may be a physical connection. For example, the physical connection may be a fixed connection, for example, a fixed connection by using a fastener, such as a fixed connection by using a screw, a bolt, or another fastener; or the physical connection may be a detachable connection, such as a clamping or buckling connection; or the physical connection may be an integrated connection, for example, a connection through welding, bonding, or integral molding. The "interconnection" or "connection" of a circuit structure may be a physical connection, or may be an electrical connection or a signal connection. For example, the "interconnection" or "connection" of the circuit structure may be a direct connection, that is, a physical connection; or may be an indirect connection through at least one intermediate element, provided that the circuit is connected; or may be an internal connection between two elements. The signal connection may be a signal connection through a circuit, or may be a signal connection through a medium, such as a radio wave. Persons of ordinary skill in the art can understand specific meanings of these terms in this application based on specific situations.

In order to clearly describe various orientations in the following embodiments, some orientation terms may be used. For example, in a coordinate system shown in FIG. 1D, a direction x represents a length direction of the battery cell 400; a direction y is perpendicular to the direction x in a horizontal surface, and indicates a width direction of the battery cell 400; a direction z is perpendicular to the direction x and the direction y, and indicates a height direction of the battery. In addition, indication directions, such as the above direction x, direction y, and direction z, that are used to describe operations and constructions of various components of the battery, are not absolute but relative. Such indications are appropriate when the components of the battery are located and oriented as shown in the figures. However, when these positions and/or orientations change, such directions should be interpreted differently to reflect the changes.

Based on the same understanding of orientations, in the description of this application, the orientations or positional relationships indicated by the terms such as "center", "longitudinal", "lateral", "length", "width", "thickness", "up", "down", "front", "rear", "left", "right", "vertical", "horizontal", "top", "bottom", "inside", "outside", "clockwise", "counterclockwise", "axial", "radial", and "circumferential" are based on the orientations or positional relationships shown in the accompanying drawings, are merely intended to facilitate the descriptions of this application and simplify the descriptions, are not intended to indicate or imply that the apparatuses or components mentioned in this application must have specific orientations, or be constructed and operated for a specific orientation, and therefore shall not be construed as a limitation to this application.

The rechargeable battery may be referred to as a secondary battery or a traction battery. Currently, widely used rechargeable batteries are lithium-ion batteries, for example, lithium-sulfur batteries, sodium lithium-ion batteries, or magnesium ion batteries, which are not limited thereto. For ease of description, the rechargeable battery herein may be collectively referred to as a battery.

A safety property of the battery is an important property to evaluate the battery. Safety of the battery needs to be guaranteed to a maximum extent during use or charging.

The battery is usually formed by connecting and combining a plurality of battery cells, and the battery cells experience temperature changes during use. In a case of an excessively high temperature, the battery cell needs to be cooled by using the thermal management component, to prevent the excessively high temperature of the battery cell from causing a failure, thermal runaway, and even an explosion of the battery cell.

However, when the liquid in the thermal management component and other components cools the battery inside the box body through a pipe, because of a temperature difference between the liquid and gas inside the box body, a condensate is likely to be formed on a pipe wall. When a large amount of condensate and the battery coexist in the same box body, safety problems such as a short circuit are prone to occur, seriously affecting service life of the battery. It may be difficult to completely cover a conductive member in the box body with an insulation material to prevent the conductive member from coming in contact with the condensate that causes a short circuit. In addition, such coating may be more difficult for irregular-shaped conductive members. This application proposes to discharge excessive condensates condensed by the thermal management component of the box body out of the box body, so as to resolve safety problems such as short circuits.

In view of this, this application provides a box body applied to battery, so as to discharge a condensate out of the battery and prevent a large amount of condensate from accumulating inside the battery for a long time to cause potential safety hazards. For the box body applied to battery in this application, the condensate can be discharged out of the battery in a timely manner, and the condensate outside the pipe wall of the pipe connected to the thermal management component can also be located in a position convenient for discharging, thereby further reducing impact of the condensate on the battery, for example, reducing a risk of short circuits of the battery cell caused by excessive condensate.

The battery in embodiments of this application can be applied to various electric apparatuses capable of using electrical energy as a power source. The electric apparatus herein may be, but not limited to, an electric vehicle, an electric train, an electric bicycle, a golf cart, a ship, a drone, or the like. In addition, the electric apparatus may be an apparatus that uses only the battery as a power source, or may be a hybrid electric apparatus. The battery provides electrical energy for the electric apparatus, and drives the electric apparatus to travel through the motor.

For example, FIG. 1A is a schematic structural diagram of an electric apparatus according to an embodiment of this application. The electric apparatus may be a vehicle, and the vehicle may be an oil-fueled vehicle, a gas-fueled vehicle, or a new energy vehicle. The new energy vehicle may be a battery electric vehicle, a hybrid electric vehicle, an extended-range vehicle, or the like. The vehicle includes a battery 200, a controller 210, and a motor 220. The battery 200 is configured to supply power to the controller 210 and the motor 220 as an operating power source and a driving power source of the vehicle. For example, the battery 200 is configured to meet an operating power requirement of the vehicle during startup, navigation, and operating. For example, the battery 200 supplies power to the controller 210, and the controller 210 controls the battery 200 to supply power to the motor 220. The motor 220 receives and uses the power of the battery 200 as a driving power source for the vehicle, to replace or partially replace fuel or natural gas to provide driving power for the vehicle.

Figure 1B:
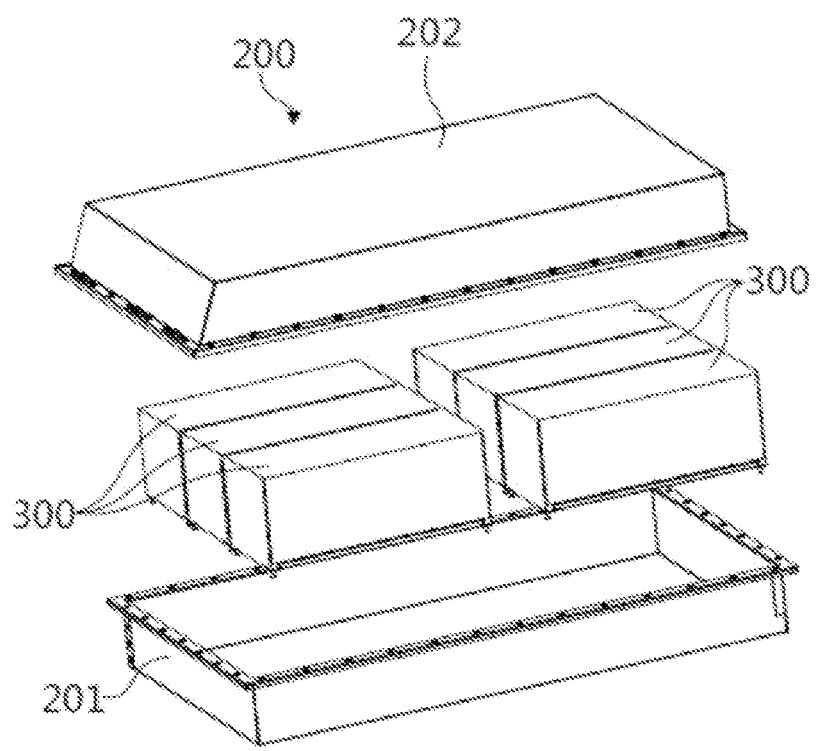
FIG. 1B is a schematic structural diagram of a battery according to an embodiment of this application.

In order to make the battery provide higher functions to meet usage requirements, the battery 200 may include a plurality of battery modules electrically connected to each other. As shown in FIG. 1B, the battery 200 includes a first box body 201, a second box body 202, and a plurality of battery modules 300. The first box body 201 and the second box body 202 are fastened together, and the plurality of battery modules 300 are arranged in a space enclosed by the first box body 201 and the second box body 202. In some embodiments, the first box body 201 and the second box body 202 are connected in a sealed manner.

Figure 1C:
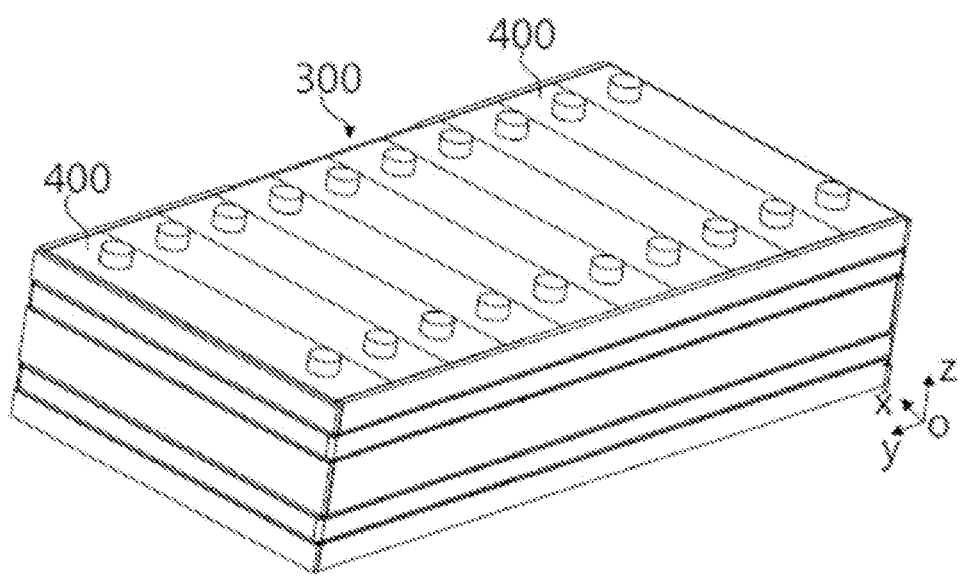
FIG. 1C is a schematic structural diagram of a battery module according to an embodiment of this application.

As shown in FIG. 1C, the battery module 300 includes a plurality of battery cells 400, and the plurality of battery cells 400 may be electrically connected in a series, parallel, or hybrid manner to implement a larger current or voltage. The hybrid connection refers to a combination of series connection and parallel connection. For example, as shown in FIG. 1C, the battery cell 400 may be placed vertically, a height direction of the battery cell 400 is consistent with the direction z, a length direction of the battery cell 400 is consistent with the direction x, and a plurality of battery cells 400 is arranged side by side along a width direction in the direction y. Alternatively, the battery cell 400 may be laid flat, the width direction of the battery cell 400 is consistent with the direction z, the length direction of the battery cell 400 is consistent with the direction x, and the plurality of battery cells 400 are stacked for at least one layer along the direction z. Each layer includes a plurality of battery cells 400 spaced apart along the direction x.

In order to make those skilled in the art clearly understand the improvements to this application, an overall structure of the battery cell 400 is first described.

Figure 1D:
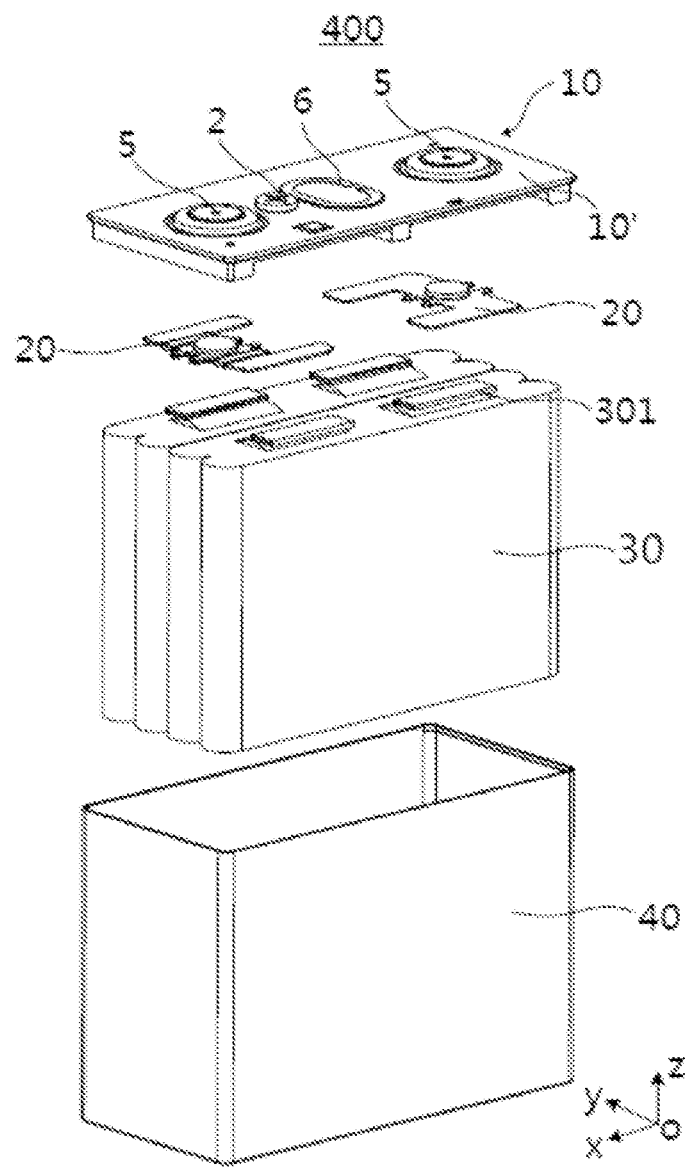
FIG. 1D is a schematic structural diagram of a battery cell according to an embodiment of this application.

As shown in FIG. 1D, the battery cell 400 includes a housing body 40, an electrode assembly 30, and an end cover assembly 10. The end cover assembly 10 includes an end cover plate 10', and the end cover plate 10' is connected (for example, being welded) to the housing body 40, to form a housing of the battery cell 400. The electrode assembly 30 is disposed in the housing body 40, and the housing body 40 is filled with electrolyte. The battery cell 400 may be of a cubic shape, a rectangular shape, or a cylindrical shape.

One or more electrode assemblies 30 may be provided based on an actual use requirement. As shown in FIG. 1D, at least two independently wound electrode assemblies 30 may alternatively be provided in the battery. A body portion of the electrode assembly 30 may be formed by winding or stacking a first electrode plate, a second electrode plate, and a separator located between the first electrode plate and the second electrode plate that are adjacent, where the separator is an insulator between the first electrode plate and the second electrode plate that are adjacent. In this embodiment, the first electrode plate being a positive electrode plate and the second electrode plate being a negative electrode plate are used as an example for description. A positive active material is applied on a coated region of the positive electrode plate, and a negative active material is applied on a coated region of the negative electrode plate. A plurality of uncoated regions extending from the coated regions of the body portion are stacked to form a tab. The electrode assembly 30 includes two tabs 301, namely a positive tab and a negative tab. The positive tab extends from the coated region of the positive electrode plate, and the negative tab extends from the coated region of the negative electrode plate.

The end cover assembly 10 is disposed at the top of the electrode assembly 30. As shown in FIG. 1D, the end cover assembly 10 includes an end cover plate 10' and two electrode terminals 5, and the two electrode terminals 5 are a positive terminal and a negative terminal. Each electrode terminal 5 is correspondingly provided with a connecting member 20, and the connecting member 20 is located between the end cover plate 10' and the electrode assembly 30.

For example, in FIG. 1D, the tab 301 of the electrode assembly 30 is located at the top, the positive tab is connected to the positive terminal through one connecting member 20, and the negative tab is connected to the negative terminal through the other connecting member 20. Optionally, the battery cell 400 may include two end cover assemblies 10, respectively disposed at two ends of the housing body 40, and each end cover assembly 10 is provided with one electrode terminal 5.

The end cover plate 10' may be further provided with an explosion-proof member to release gas out of the battery cell 400 in a timely manner in a case of too much gas in the battery cell 400, thereby avoiding explosion.

The end cover plate 10' is provided with a degassing hole, and the degassing hole may be provided at a middle position of the end cover plate 10' in the length direction. The explosion-proof member includes a pressure relief mechanism 6, and the pressure relief mechanism 6 is disposed in the degassing hole. In a normal state, the pressure relief mechanism 6 is installed in the degassing hole in a sealed manner. The pressure relief mechanism 6 is actuated to be open when the battery cell 400 swells to increase an air pressure in the housing to exceed a preset value, and the gas is released outward through the pressure relief mechanism 6.

The pressure relief mechanism 6 is an element or a component that can be actuated to release internal pressure and/or internal substances when the internal pressure or internal temperature of the battery cell 400 reaches a predetermined threshold. The pressure relief mechanism 6 may be specifically in a form of an explosion-proof valve, a gas valve, a pressure relief valve, a safety valve, or the like, and may specifically use a pressure-sensitive or temperature-sensitive element or structure. That is, when the internal pressure or temperature of the battery cell 400 reaches the predetermined threshold, the pressure relief mechanism 6 performs an action or a weak structure provided in the pressure relief mechanism 6 is damaged, to form an opening or a channel for releasing the internal pressure. The threshold described in this application may be a pressure threshold or a temperature threshold. Design of the threshold varies with different design requirements, for example, the threshold may be designed or determined based on an internal pressure value or internal temperature value that is considered to be dangerous or out of control for the battery cell 400. In addition, the threshold may depend on a material of one or more of the positive electrode plate, the negative electrode plate, the electrolyte, and the separator in the battery cell 400.

"Actuate" described in this application means that the pressure relief mechanism 6 performs an action or is activated to a specific state, so that the internal pressure of the battery cell 400 can be relieved. The action performed by the pressure relief mechanism 6 may include but is not limited to: cracking, breaking, tearing, or opening at least part of the pressure relief mechanism 6, or the like. When the pressure relief mechanism 6 is actuated, high-pressure and high-temperature substances inside the battery cell 400 are released from an actuated part as emissions. In this way, the battery cell 400 discharges its pressure under a condition of controllable pressure or temperature, thereby avoiding more serious potential accidents. The emissions from the battery cell 400 described in this application include but are not limited to: electrolyte, fragments of positive and negative electrode plates and separator because of dissolution or breaking, high-temperature and high-pressure gas and flames generated by reactions, and the like. The high-temperature and high-pressure emissions are released toward a side of the battery cell 400 at which the pressure relief mechanism 6 is disposed, and may be more specifically released toward a region for actuation of the pressure relief mechanism 6. The strength and destructive power of such emissions are probably great, even great enough to break one or more structures in that direction.

In some embodiments, as shown in FIG. 1D, the end cover plate 10' is provided with a through hole for injecting the electrolyte into the battery cell 400. The through hole may be a round hole, an elliptical hole, a polygonal hole, or holes of other shapes, and may extend along the height direction of the end cover plate 10'. The end cover plate 10 is provided with an injection member 2 for closing the through hole.

Figure 2:
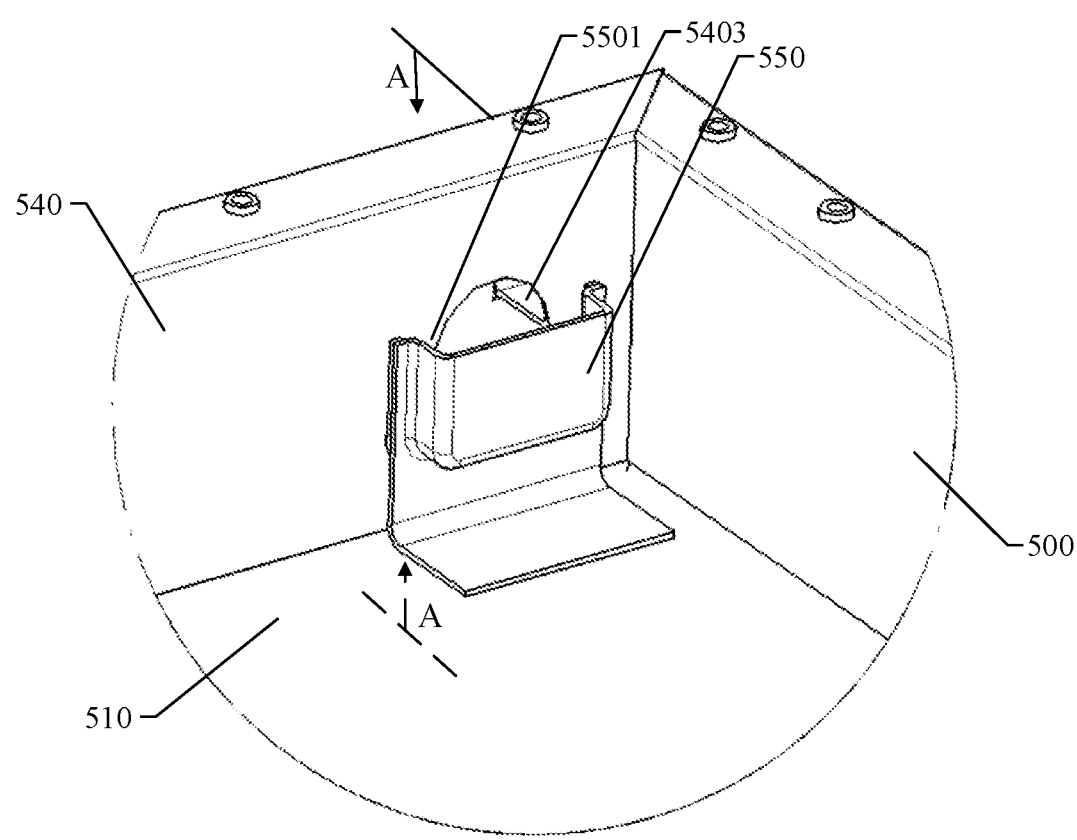
FIG. 2 is a schematic partial structural diagram of an interior of a box body applied to battery according to an embodiment of this application.
Figure 3:
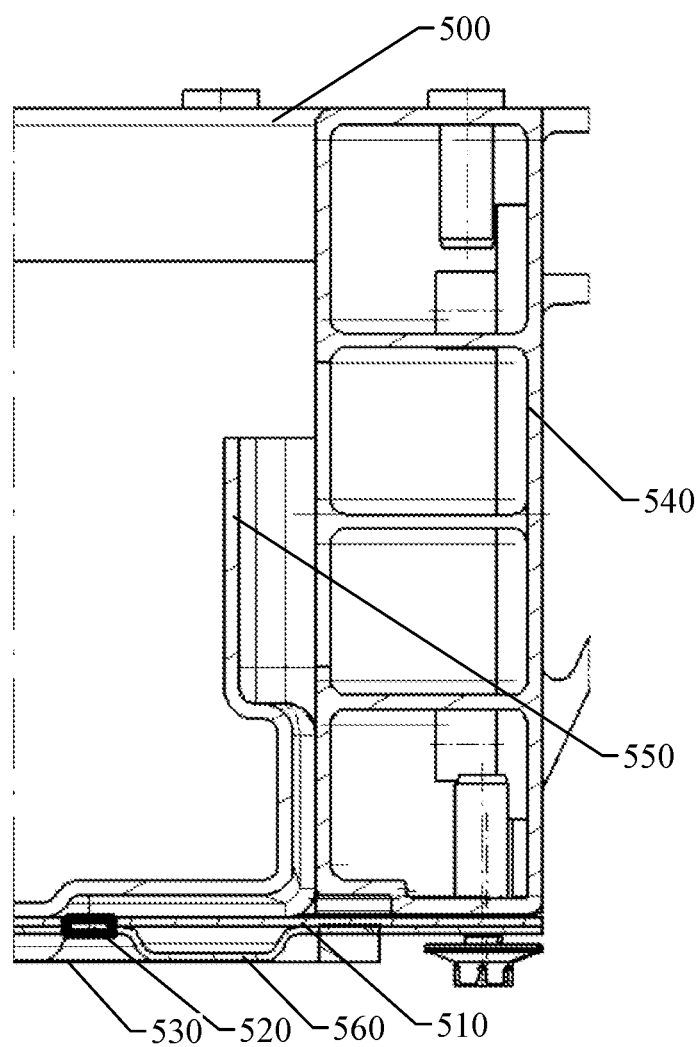
FIG. 3 is a schematic cross-sectional diagram in direction A-A in FIG. 2 according to an embodiment of this application.

As shown in FIG. 2 and FIG. 3, a box body 500 applied to battery 200 provided in embodiments of this application includes a carrying plate 510 and a one-way gravity valve 520. The carrying plate 510 is mainly configured to carry the battery 200, and the one-way gravity valve 520 is provided at the carrying plate 510, and is configured to be closed when a gravity of liquid in the box body 500 is less than a threshold; and to be open when the gravity of the liquid in the box body 500 reaches the threshold, so as to discharge the liquid through the one-way gravity valve 520.

The box body 500 provided by embodiments of this application is provided with the one-way gravity valve 520. When there is excessive liquid in the box body, for example, when the gravity of the liquid reaches the threshold, the liquid in the box body 500 can be discharged in a timely manner, so as to avoid holding up excessive liquid in the box body 500 for a long time, thereby reducing potential safety hazards and improving service life of the battery 200.

It should be noted that, in addition to the condensate generated on the outer wall of the pipe connected to the thermal management component, the liquid in the box body 500 includes emissions released during actuation of the pressure relief mechanism 6 of the battery cell 400, and so on. The condensate and the emissions are likely to hold up in the box body 500, further affecting service life of the battery 200 and even resulting in safety hazards. In embodiments of this application, the one-way gravity valve 520 provided in the box body can discharge the liquid out of the box body 500 in a time manner, to avoiding the liquid from being held up in the box body 500 for a long time, and further improving the service life and use safety of the battery 200.

In embodiments of this application, the carrying plate 510 for carrying the battery 200 is usually disposed at the bottom of the box body 500. Therefore, the one-way gravity valve 520 disposed at the carrying plate 510 is also disposed at the bottom of the box body 500, helping discharge the liquid out of the box body 500.

As shown in FIG. 2 and FIG. 3, in embodiments of this application, the one-way gravity valve 520 may be disposed close to a side wall of the box body 500. The side wall is provided with a via hole through which the pipe connected to the thermal management component passes. The outer wall of the pipe near the via hole is more likely to produce a condensate. Therefore, the one-way gravity valve 520 is disposed in a position near the via hole, facilitating discharge of the condensate.

In a practical application, a value of the threshold may be set based on actual needs, and a structure and size of the one-way gravity valve 520 may be determined based on the value of the threshold, so as to meet needs of discharging the liquid out of the box body 500. This is not particularly limited in embodiments of this application.

It should be noted that the structure for liquid discharging in embodiments of this application is the one-way gravity valve 520 related to gravity, and therefore the threshold is also a gravity-related value.

It should also be noted that, in addition to the one-way gravity valve 520 provided in embodiments of this application for discharging the liquid, other structures may alternatively be used for discharging the liquid out of the box body 500, and any structure facilitating discharging of the liquid out of the box body 500 should fall within the protection scope of the embodiments of this application.

Figure 4:
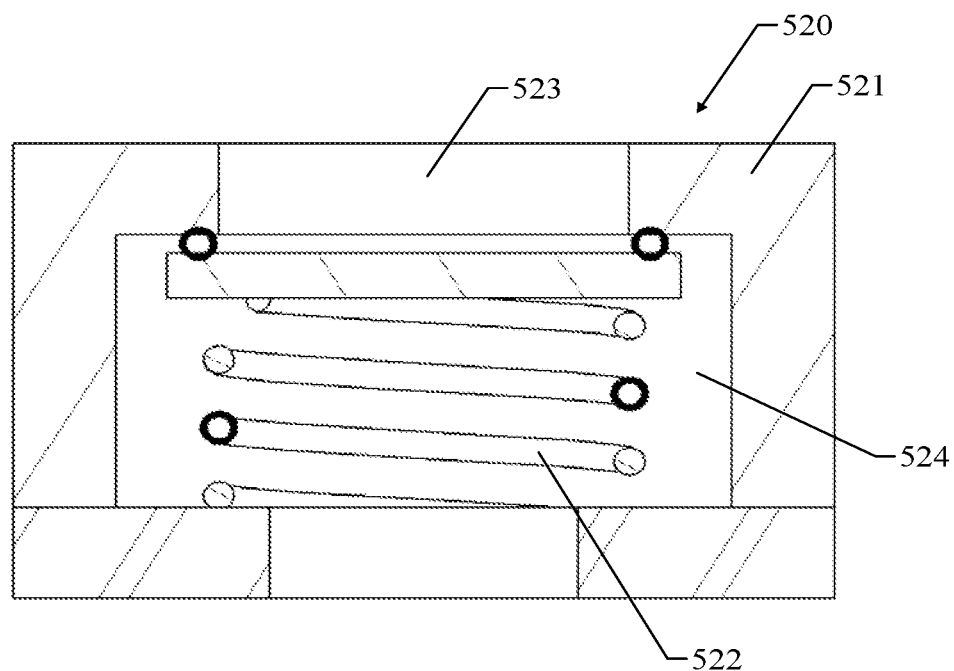
FIG. 4 is a first schematic cross-sectional diagram of a one-way gravity valve according to an embodiment of this application.
Figure 5:
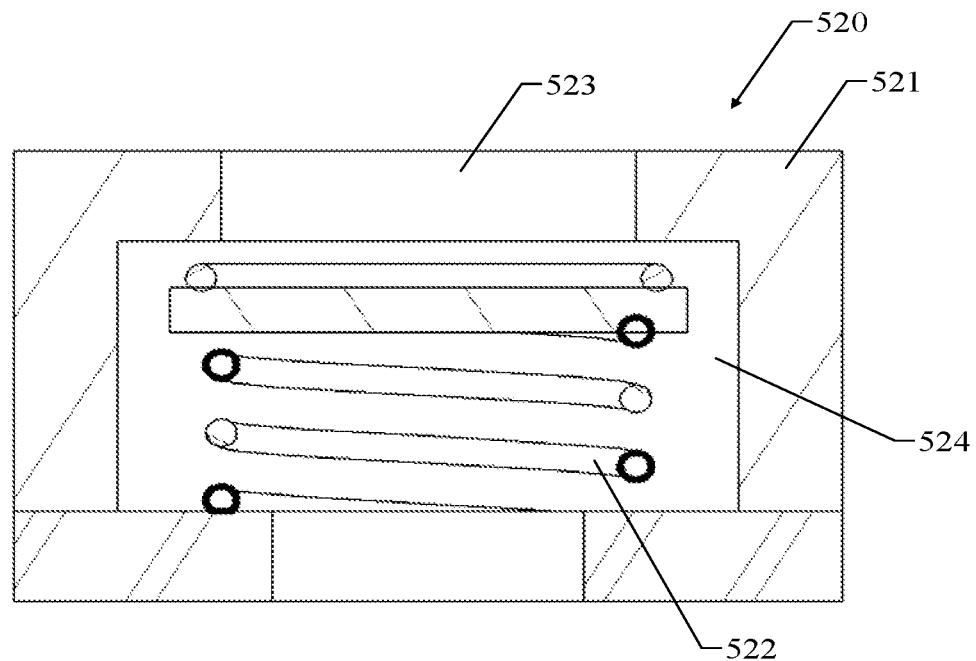
FIG. 5 is a second schematic cross-sectional diagram of a one-way gravity valve according to an embodiment of this application.

As shown in FIG. 4 and FIG. 5, in an example, in embodiments of this application, the device in use is the one-way gravity valve 520, and the one-way gravity valve 520 includes a liquid discharge member 521 and a movable assembly 522. The liquid discharge member 521 has a first through hole 523, and the liquid discharge member 521 is configured to discharge the liquid such as the condensate and emissions through the first through hole 523 when the gravity of the liquid in the box body 500 reaches the threshold. The movable assembly 522 is installed at the liquid discharge member 521 and capable of moving relative to the first through hole 523, so that the movable assembly 522 seals the first through hole 523 when the gravity of the liquid in the box body 500 is less than the threshold, and opens the first through hole 523 when the gravity of the liquid in the box body 500 reaches the threshold.

FIG. 4 shows a case that the movable assembly 522 seals the first through hole 523 when the gravity of the liquid in the box body 500 is less than the threshold, so as to play a role of sealing the box body 500 when there is a small amount of liquid or no liquid in the box body 500. FIG. 5 shows a case that the movable assembly 522 opens the first through hole 523 when the gravity of the liquid in the box body 500 reaches the threshold, so as to open the first through hole 523 to discharge the liquid when there is a large amount of liquid needing to be discharged out of the box body 500. This avoids holding up the liquid in the box body 500 for a long time to affect normal use of the battery 200.

In a practical application, there may be various specific positions for disposing the movable assembly 522. For example, the movable assembly 522 may be disposed at the bottom of the first through hole 523, or may be disposed at the side wall of the first through hole 523, which is not particularly limited in embodiments of this application.

In embodiments of this application, further referring to FIG. 4 and FIG. 5, the liquid discharge member 521 may have an accommodating chamber 524, and the movable assembly 522 may be disposed in the accommodating chamber 524 and is capable of moving up and down in the accommodating chamber 524. The movable assembly 522 moves up and down in the accommodating chamber 524 to seal or open the first through hole 523.

In a practical application, because the movable assembly 522 needs to seal and open the first through hole 523 inside the accommodating chamber 524, the accommodating chamber 524 needs to communicate with the first through hole 523, so that the liquid flowing into the first through hole 523 can flow through the accommodating chamber 524 to facilitate liquid discharge.

In a practical application, the accommodating chamber 524 may be provided at the bottom of the first through hole 523, or may be provided at the middle of the first through hole 523, with a central axis of the accommodating chamber 524 aligned with a central axis of the first through hole 523, thereby facilitating centering of the movable assembly 522 and the first through hole 523 to achieve a better sealing effect.

In a practical application, the movable assembly 522 may be in various structural forms provided that the first through hole 523 can be sealed or opened movably under the action of gravity, which is not particularly limited in embodiments of this application.

Figure 6:
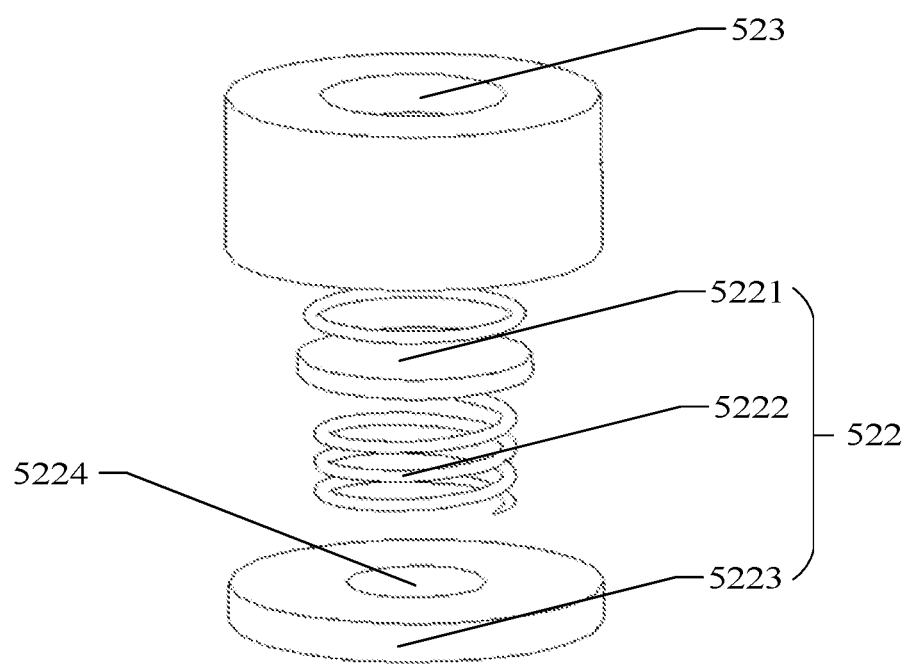
FIG. 6 is an exploded view of a one-way gravity valve according to an embodiment of this application.

As shown in FIG. 6, in embodiments of this application, the movable assembly 522 further includes a sealing member 5221 and an elastic member 5222. The sealing member 5221 is movably connected to the accommodating chamber 524 to seal or open the first through hole 523. The elastic member 5222 is configured to provide a preset supporting force to the sealing member 5221, and the preset supporting force is the same as the threshold, so that the sealing member 5221 can seal the first through hole 523 when the gravity of the liquid in the box body 500 is less than the preset supporting force, and open the first through hole 523 when the gravity of the liquid in the box body 500 reaches the preset supporting force, to discharge the liquid.

In embodiments of this application, in a simple connection manner, the sealing member 5221 may be directly connected to the elastic member 5222, and the elastic member 5222 directly supports the sealing member 5221 to provide the preset supporting force to the sealing member 5221.

In a practical application, the sealing member 5221 may be a structural member such as a sealing gasket whose cross-sectional area is larger than a cross-sectional area of the first through hole 523. The elastic member 5222 may be a spring, and an upper end of the spring is connected to the sealing member 5221, and a lower end of the spring is supported on a spring base 5223. The spring base 5223 can play a role of fixing and limiting the lower end of the spring, preventing the spring from being twisted in an extension and contraction process and affecting alignment of the sealing member 5221 and the first through hole 523, and reducing impact on the sealing effect. In addition, a second through hole 5224 needs to be further provided at the spring base 5223, so that the liquid flowing into the accommodating chamber 524 can be discharged from the second through hole 5224.

The box body 500 provided in embodiments of this application further includes a bottom plate 530. The bottom plate 530 is configured to connect to the carrying plate 510 to form a water storage chamber. The water storage chamber communicates with the first through hole 523, so as to collect the liquid discharged from the first through hole 523, thereby preventing the liquid out of the box body 500 from directly flowing to the electric apparatus using the battery 200 to cause safety hazards.

In a practical application, the bottom plate 530 may be detachably connected to the carrying plate 510. When the liquid in the water storage chamber reaches a specific amount, the bottom plate 530 may be disassembled to discharge the liquid out of the water storage chamber. Alternatively, a liquid discharge opening may be provided in the bottom plate 530, and the liquid discharge opening is sealed by using a detachable sealing plug, so as to open the sealing plug when necessary to discharge the liquid out of the water storage chamber.

As shown in FIG. 2, in embodiments of this application, the box body 500 further includes a first wall 540. The first wall 540 is configured to connect to the carrying plate 510 to form an accommodating chamber for accommodating the battery 200, the first wall 540 is provided with a liquid discharge hole 5403, and the liquid discharge hole 5403 is configured to discharge liquid exceeding a height of the liquid discharge hole 5403 when a height of a liquid surface of the liquid in the box body 500 in a direction of gravity is greater than or equal to that of the liquid discharge hole 5403. This avoids a case that only the one-way gravity valve 520 cannot meet a requirement of timely and rapid liquid discharge when there is excessive liquid in the box body 500, so as to ensure that the liquid in the box body 500 can be discharged in a timely manner.

In a practical application, a position for providing the liquid discharge hole 5403 may be set based on an actual situation, for example, the liquid discharge hole 5403 is provided at a position of the first wall 540 close to the carrying plate 510, which is not particularly limited in embodiments of this application. In addition, a shape of the liquid discharge hole 5403 may be circular, elliptical, semi-circular, or the like. A size of the liquid discharge hole 5403 may be determined based on a size of the box body 500, which is not particularly limited in embodiments of this application.

Figure 7:
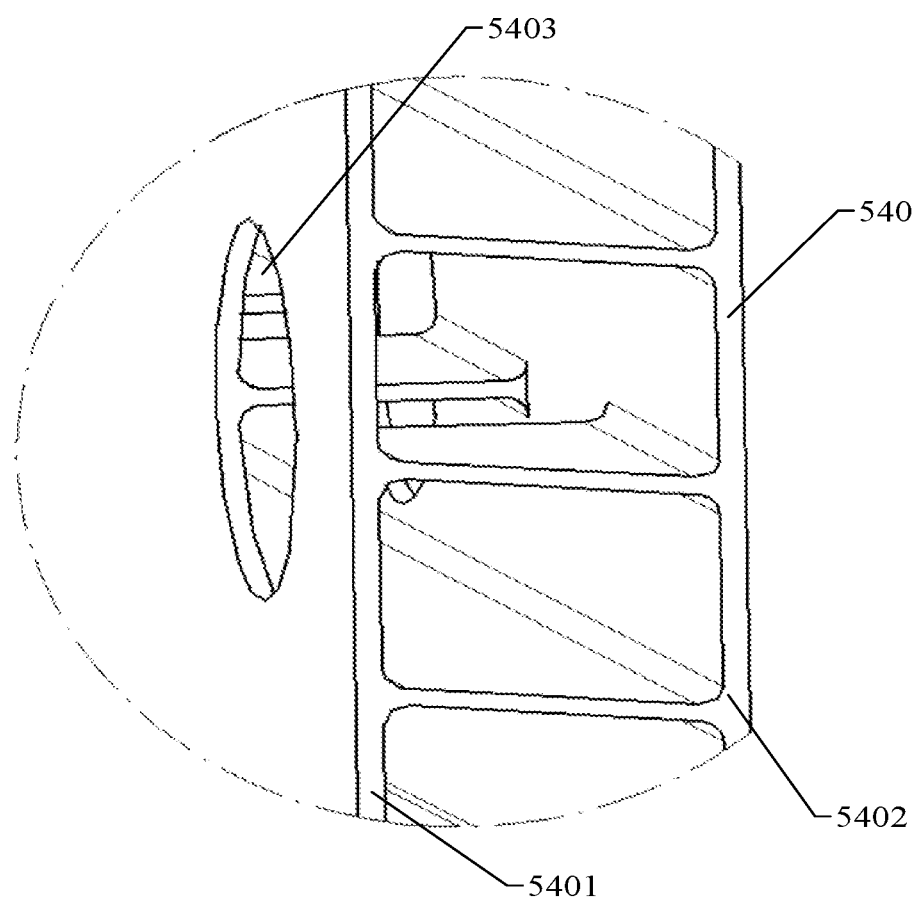
FIG. 7 is a first schematic local diagram of a box body according to an embodiment of this application.

FIG. 7 is a schematic structural diagram of the liquid discharge hole 5403 on the first wall 540. In embodiments of this application, the first wall 540 includes a first sub-wall 5401 and a second sub-wall 5402, and a hollow chamber is formed between the first sub-wall 5401 and the second sub-wall 5402. The first sub-wall 5401 is an inner wall of the box body 500, and the second sub-wall 5402 is an outer wall of the box body 500. The first sub-wall 5401 is provided with the liquid discharge hole 5403, that is, the liquid discharge hole 5403 penetrates through only the first sub-wall 5401 of the first wall 540, so that the liquid whose height of the liquid surface in the direction of gravity is greater than or equal to that of the liquid discharge hole 5403 is collected in the hollow chamber and the liquid in the box body 500 can be discharged in a timely manner.

Figure 8:
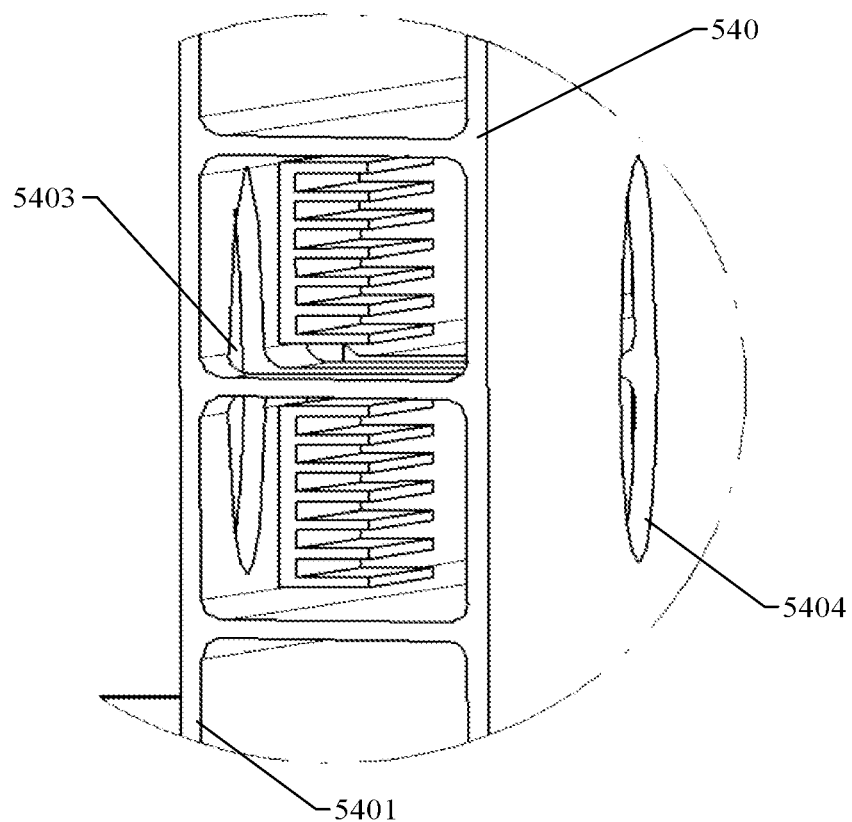
FIG. 8 is a second schematic local diagram of a box body according to an embodiment of this application.

As shown in FIG. 8, the first wall 540 further includes a vent hole 5404, and the vent hole 5404 is configured to communicate with the inside and the outside of the box body 500. In a practical application, the liquid discharge hole 5403 may be part of the vent hole 5404, so as to function as a vent while discharging the fluid.

As shown in FIG. 2, in embodiments of this application, the box body 500 further includes a condensing part 550. The condensing part 550 may be configured to block the vent hole 5404 (that is, block the position in which the liquid discharge hole 5403 is located), so as to condense gas that flows into the box body 500 through the vent hole 5404. The condensing part 550 may condense the gas flowing into the box body 500 in advance, so that the condensed liquid can be collected in a specified position. In this way, condensed liquid resulting from condensing of gas dispersed into the box body 500 can be prevented from flowing into different positions of the box body 500, implementing collection of the condensate and facilitating discharge of the condensate.

In embodiments of this application, the condensing part 550 is disposed at the inner surface of the box body 500 at a position opposite the vent hole 5404, so that gas flowing from the vent hole 5404 first comes in contact with the condensing part 550, to achieve a purpose of preventing the gas from condensing in the box body and then coming in contact with conductive members inside the box body.

In a practical application, as shown in FIG. 3, the box body 500 further includes a thermal management component 560. The thermal management component 560 is configured to adjust a temperature of the battery 200. The thermal management component 560 intersects the first wall 540 to enter the box body 500 through the first wall 540, thereby implementing temperature adjustment for the battery 200. The thermal management component 560 may be a component such as a water cooling plate, which is not particularly limited in embodiments of this application.

Further referring to FIG. 3, in embodiments of this application, a first portion of the condensing part 550 extends along the thermal management component 560, so as to be attached to the thermal management component 560, so that the condensing part 550 can conduct heat with the thermal management component 560 and the condensing part 550 has a good condensing effect. A second portion of the condensing part 550 extends along the first wall 540 to block the vent hole 5404, so that the condensate resulting from condensing of the gas entering from the vent hole 5404 is also collected in the condensing part 550, thereby preventing the condensate from flowing to other positions of the box body 500 and facilitating discharge of the condensate.

In a practical application, the condensing part 550 may be in various structural forms. In embodiments of this application, the condensing part 550 may be a cover structure, and the cover structure may block the vent hole 5404, so that gas entering from the vent hole 5404 can come in contact with the cover structure and be condensed on the cover structure. The resulting condensate flows along the cover structure and is collected in the condensing part 550 along the cover structure.

In embodiments of this application, a space enclosed by the condensing part 550 and the box body 500 communicates with the first through hole 523 of the one-way gravity valve 520, so that the condensate collected in the condensing part 550 can flow to the one-way gravity valve 520, and is discharged from the first through hole 523 when the gravity of the liquid reaches the threshold.

Further referring to FIG. 2 and FIG. 8, the condensing part 550 with a cover structure is attached to a region of the first wall 540 that surrounds the vent hole 5404, and is provided with a first opening 5501 through which gas flows into the box body 500. The gas condensed in the cover structure may enter the box body 500 through the first opening 5501. Because the gas has already been condensed once, a probability of re-condensing of the gas entering the box body 500 is reduced. Even if the gas is re-condensed, the resulting condensate may not be excessive to bring safety hazards.

In embodiments of this application, the first opening 5501 is provided in a first direction of the cover structure, and the first direction is a direction opposite the direction of gravity.

In a practical application, in order to prevent greater harm caused by high-temperature and high-pressure emissions discharged out of the battery cell 400 during thermal runaway of the battery cell 400, a fire prevention system is usually provided inside the box body 500, to implement fire prevention for the battery cell 400.

In embodiments of this application, the position of the first opening 5501 may be opposite a joint of the pipe of the fire prevention system. The first opening 5501 can collect fluid leaked from the joint of the pipe of the fire prevention system in a case of fluid leakage at the joint of the pipe of the fire prevention system, so as to prevent the fluid leaked at the joint of the pipe of the fire prevention system from flowing into the box body 500 to affect the battery 200.

In a practical application, a size of the first opening 5501 may be set to be larger, so as to able to catch the fluid leaked from the joint of the pipe of the fire-fighting system, and a specific size is not limited in embodiments of this application.

Figure 9:
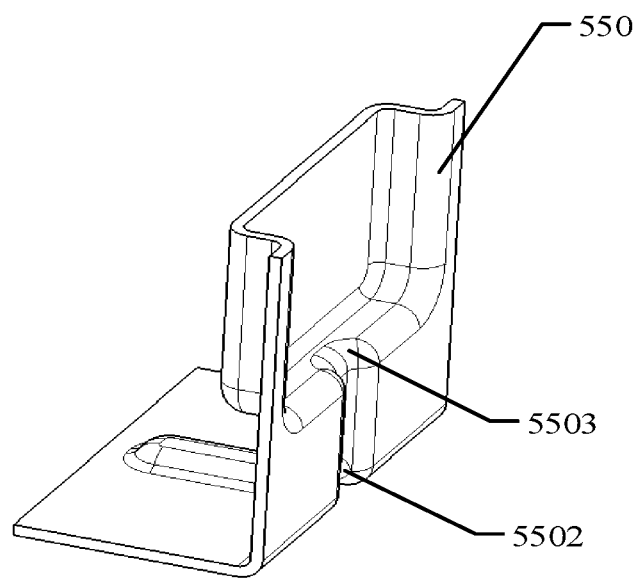
FIG. 9 is a schematic structural diagram of a condensing part according to an embodiment of this application.
Figure 10:
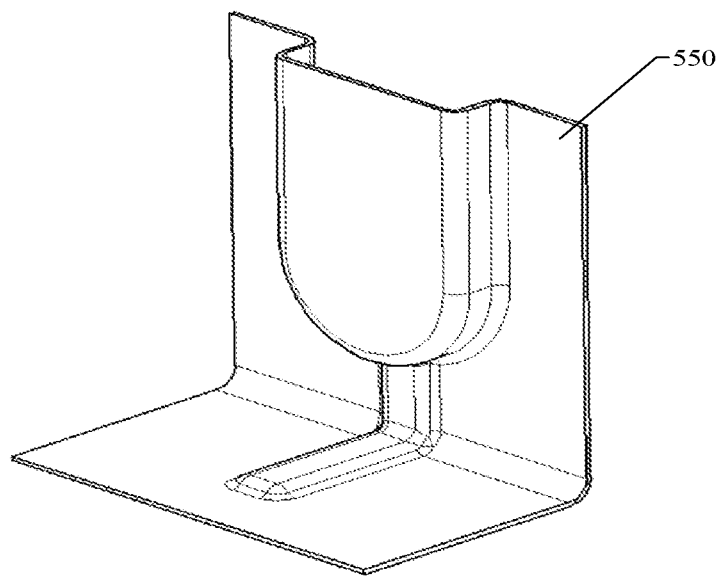
FIG. 10 is a schematic structural diagram of another condensing part according to an embodiment of this application.
Figure 11:
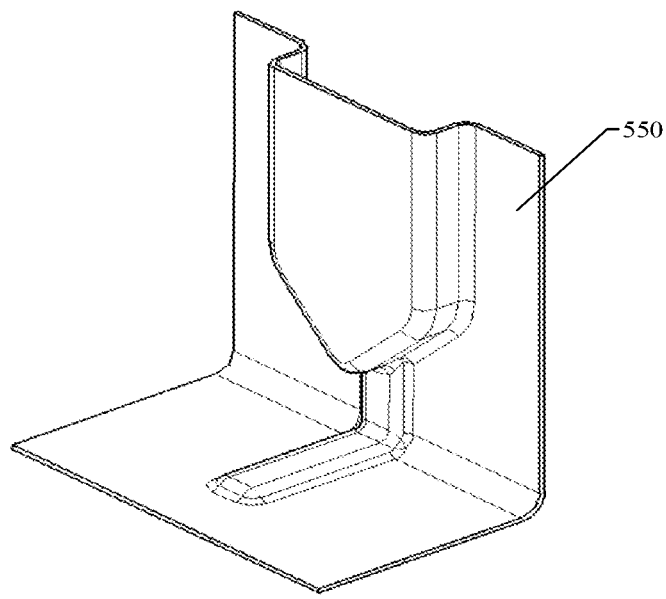
FIG. 11 is a schematic structural diagram of still another condensing part according to an embodiment of this application.

In a practical application, a projection of the cover structure on the first wall 540 may be of various shapes, for example, a rectangular area as shown in FIG. 9, a U-shaped area as shown in FIG. 10, and a V-shaped area as shown in FIG. 11, which is not particularly limited in embodiments of this application. In addition, the specific size of the cover structure may be determined based on an actual size of an accommodating space of the box body 500, which is not particularly limited in embodiments of this application.

As shown in FIG. 9 to FIG. 11, the cover structure of the condensing part 550 is further provided with a flow channel 5502, and the flow channel 5502 is configured to guide the condensate of the cover structure to the one-way gravity valve 520. Portions of the condensing part 550 on two sides of the flow channel 5502 are attached to the first wall 540.

In a practical application, attaching described above may be in various connection manners such as welding or gluing, which is not limited in embodiments of this application.

In embodiments of this application, the cover structure has a second opening 5503 corresponding to the flow channel 5502, and the second opening 5503 is configured to guide the condensate on the cover structure to the flow channel 5502 and then into the one-way gravity valve 520 through the flow channel 5502. The one-way gravity valve 520 is further configured to discharge the condensate out of the box body 500 from the flow channel 5502 when a gravity of the condensate in the flow channel 5502 reaches the threshold. The second opening 5503 is provided in a second direction of the cover structure, and the second direction is the direction of gravity.

In a practical application, the flow channel 5502 may be designed as a thin strip to increase a height of the flow channel and further increase pressure of the liquid, thereby ensuring that the liquid in the flow channel can reach the threshold of the one-way gravity valve 520 and the one-way gravity valve can be open in a timely manner.

Figure 12:
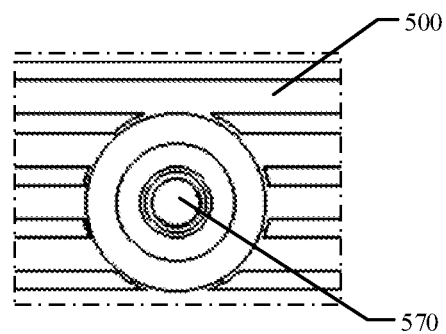
FIG. 12 is a schematic structural diagram of a pressure balance mechanism according to an embodiment of this application.

As shown in FIG. 12, the box body 500 further includes a pressure balance mechanism 570, and the pressure balance mechanism 570 is configured to balance the pressure inside and outside the box body 500. In a practical application, the pressure balance mechanism 570 may be installed in the vent hole 5404 of the box body, and gas outside the box body 500 can flow into the box body 500 through the pressure balance mechanism 570.

Figure 13:
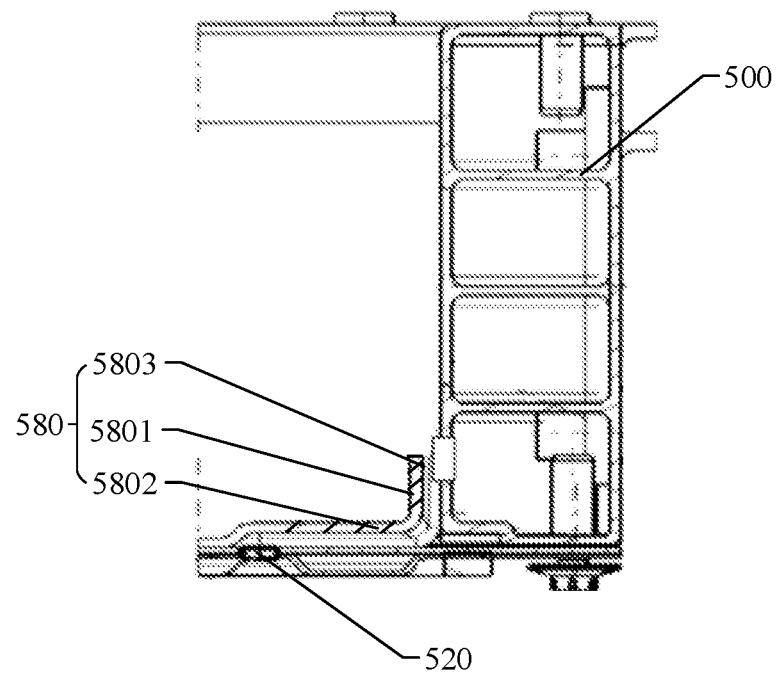
FIG. 13 is a schematic structural diagram of a liquid storage member according to an embodiment of this application.

As shown in FIG. 13, in embodiments of this application, the box body 500 further includes a liquid storage member 580 disposed at the inner surface of the box body 500, and the liquid storage member 580 is configured to, when the height of the liquid surface of the liquid in the box body 500 in the direction of gravity reaches a height of the liquid storage member 580, store liquid that flows into the liquid storage member 580, and discharge the liquid flowing into the liquid storage member 580 to the one-way gravity valve 520.

In a practical application, the liquid storage member 580 includes a height-limiting plate 5801 and a guiding plate 5802. The height-limiting plate 5801 comes in contact with the inner surface of the first sub-wall 5401, and the height-limiting plate 5801 and the first sub-wall 5401 form a liquid height-limiting cavity 5803 with an opening on the top in the direction of gravity. The liquid height-limiting cavity 5803 is configured to allow flowing of the liquid when a surface of the liquid is higher than the liquid height-limiting cavity 5803 in the direction of gravity. The guiding plate 5802 comes in contact with a surface of the carrying plate 510 facing toward the battery cell 400, and a guiding channel is provided between the guiding plate 5802 and the carrying plate 510. Two ends of the guiding channel communicate with the liquid height-limiting cavity 5803 and the one-way gravity valve 520 respectively. The guiding channel is configured to discharge the liquid from the liquid height-limiting cavity 5803 to the one-way gravity valve 520.

In another aspect, this application further provides a battery assembly. The battery assembly includes the foregoing box body 500 and the battery 200, and the box body 500 is configured to accommodate the battery 200. The specific structural form and working principle of the box body 500 have been described in detail in the foregoing embodiment, and details are not repeated in this embodiment.

To sum up, the battery assembly in embodiments of this application is provided with the box body, and the box body is provided with the one-way gravity valve. A time for discharging the liquid in the box body is determined based on the threshold of the one-way gravity valve. When there is excessive liquid in the box body, the liquid in the box body can be discharged in a timely manner, thereby reducing safety hazards and improving service life of the battery. When there is a relatively small amount of liquid in the box body that is not enough to open the one-way gravity valve, the small amount of liquid in the box body can play a role of cooling the battery inside the box body under the premise of not affecting safety performance of the battery.

In another aspect, this application further provides an electric apparatus. The electric apparatus includes the battery 200 described above, and the battery 200 is configured to supply electrical energy. The battery 200 is disposed in the box body 500, and the box body 500 can discharge the liquid outside in a timely, so as to prevent the liquid from being held up in the box body 500 for a long time and cause potential safety hazard. The specific structural form and working principle of the box body 500 have been described in detail in the foregoing embodiment, and details are not repeated in this embodiment.

The foregoing describes the battery assembly and the electric apparatus in the embodiments of this application; and the following describes a method and device for preparing battery assembly in the embodiments of this application. For those not described in detail, reference can be made to the foregoing embodiments.

Figure 14:
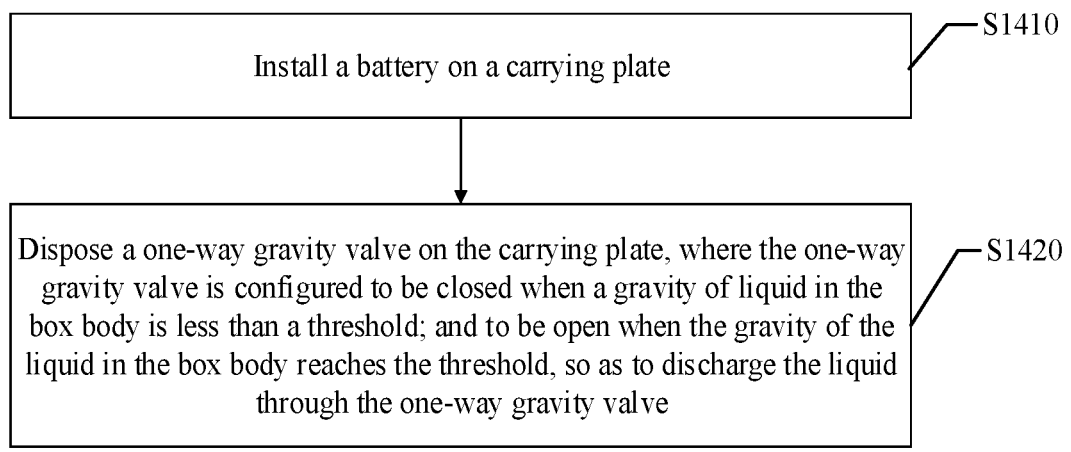
FIG. 14 is a flowchart of a method for preparing battery assembly according to an embodiment of this application.

In another aspect, an embodiment of this application further provides a method for preparing battery assembly. As shown in FIG. 14, the method for preparing battery assembly may include the following steps.

Step S1410: Install a battery on a carrying plate.

Step S1420: Dispose a one-way gravity valve on the carrying plate, where the one-way gravity valve is configured to be closed when a gravity of liquid in the box body is less than a threshold, and to be open when the gravity of the liquid in the box body reaches the threshold, so as to discharge the liquid through the one-way gravity valve.

With reference to the embodiments of the box body 500, it can be learned that the battery 200 is disposed in the box body 500. When there is a relatively large amount of liquid in the box body 500, the liquid can be discharged through the one-way gravity valve 520 disposed in the box body 500, thereby reducing potential safety hazards and improving service life of the battery 200.

With reference to the embodiments of the box body 500, it can be learned that the box body 500 further includes other components, and the components can be manufactured by using a corresponding method to finally obtain the box body 500 as required that is convenient for liquid discharge. In a practical application, any methods for manufacturing related components and connecting related components fall within the protection scope of the embodiments of this application, and details are not described in the embodiments of this application.

Figure 15:
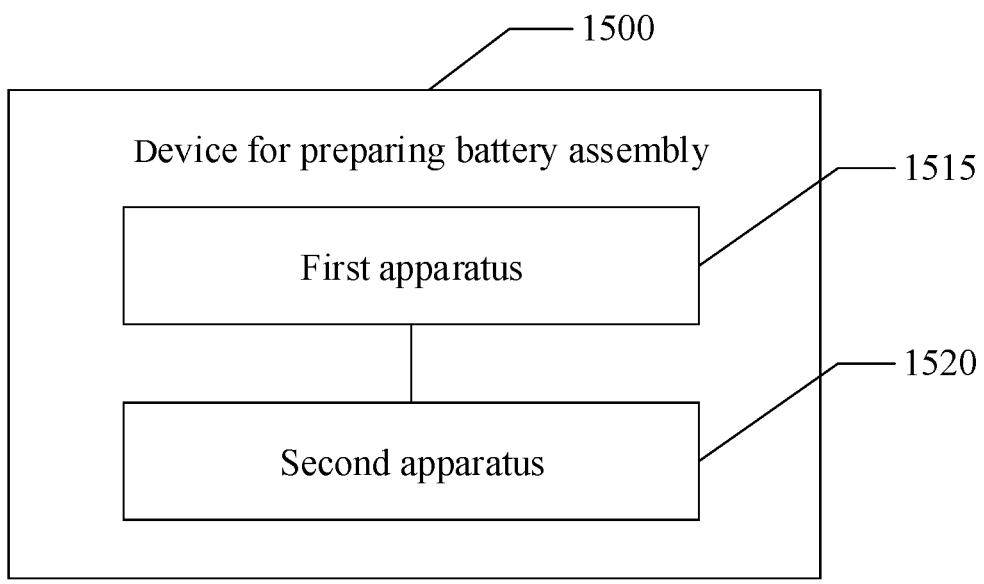
FIG. 15 is a block diagram of a device for preparing battery assembly according to an embodiment of this application.

In another aspect, an embodiment of this application further provides a device for preparing battery assembly. Referring to FIG. 15, FIG. 15 is a block diagram of a device for manufacturing battery assembly according to an embodiment of this application. As shown in FIG. 15, the device 1500 for preparing battery assembly may include: a first apparatus 1510 and a second apparatus 1520.

The first apparatus 1510 may be configured to install a battery on a carrying plate, where the carrying plate is part of a box body and is disposed at the bottom of the box body.

The second apparatus 1520 may be configured to dispose a one-way gravity valve on the carrying plate.

The one-way gravity valve is configured to be closed when a gravity of liquid in the box body is less than a threshold, and to be open when the gravity of the liquid in the box body reaches the threshold, so as to discharge the liquid through the one-way gravity valve.

Specific details of the devices for preparing battery assembly have been described in detail in the corresponding embodiment of the box body used for the battery, and details are not repeated herein.

For the foregoing subjects of this application and the features in the embodiments, reference may be made to each other. Those skilled in the art can also flexibly combine the technical features in the different embodiments to form more embodiments if the structure permits.

The battery assembly, the electric apparatus, and the method and device for manufacturing the battery assembly provided by this application are described in detail above. Specific embodiments are used in this specification to describe the principles and implementations of this application, and the descriptions of the foregoing embodiments are merely intended to help understand the method and core ideas of this application. It should be noted that those of ordinary skill in the art may further make several improvements and modifications to this application without departing from the principles of this application, and these improvements and modifications also fall within the protection scope of the claims of this application.

The invention claimed is:

1. A box body comprising:
a carrying plate;
a one-way gravity valve disposed at the carrying plate, wherein:
the one-way gravity valve is configured:
to be closed in response to a gravity of liquid in the box body being less than a threshold, and
to be open in response to the gravity of the liquid in the box body reaching the threshold; and
the one-way gravity valve comprises:
a liquid discharge member provided with a through hole and configured to discharge the liquid through the through hole in response to the gravity of the liquid in the box body reaching the threshold; and
a bottom plate arranged below and connected to the carrying plate;
wherein:
the carrying plate is configured to carry a battery comprising a battery cell, the battery cell comprising:
a housing body;
an electrode assembly disposed in the housing body; and
an end cover assembly comprising:
an end cover plate connected to the housing body to form a housing of the battery cell; and
an electrode terminal coupled to the electrode assembly;
the carrying plate is configured to be between a bottom of the housing body of the battery cell and the bottom plate; and
a water storage chamber communicating with the through hole is formed between the carrying plate and the bottom plate.

2. The box body according to claim 1, further comprising:
a wall connected to the carrying plate to form an accommodating chamber for accommodating the battery, the wall being a side wall of the box body approximately perpendicular to the carrying plate, the wall being provided with a liquid discharge hole configured to discharge a portion of the liquid that is above the liquid discharge hole in response to a height of a liquid surface of the liquid in the box body in a direction of gravity being greater than or equal to a height of the liquid discharge hole.

3. The box body according to claim 2, wherein the wall comprises a first sub-wall and a second sub-wall, a hollow chamber is formed between the first sub-wall and the second sub-wall, the first sub-wall is an inner wall of the box body, the second sub-wall is an outer wall of the box body, and the first sub-wall is provided with the liquid discharge hole.

4. The box body according to claim 3,
wherein the wall further comprises a vent hole communicating with inside and outside of the box body;
the box body further comprising:
a condensing part configured to block the vent hole.

5. The box body according to claim 4, wherein the condensing part is provided at an inner surface of the box body.

6. The box body according to claim 4, further comprising:
a thermal management component configured to adjust a temperature of the battery and intersecting the wall;
wherein:
a first portion of the condensing part extends along the thermal management component and is attached to the thermal management component; and
a second portion of the condensing part extends along the wall and blocks the vent hole.

7. The box body according to claim 4, wherein the condensing part comprises a cover structure, and the cover structure blocks the vent hole.

8. The box body according to claim 7, wherein the cover structure is attached to a region of wall that surrounds the vent hole, and is provided with an opening.

9. The box body according to claim 8, wherein the opening is provided in a direction of the cover structure that is opposite the direction of gravity.

10. The box body according to claim 8, wherein the opening is configured to collect fluid leaked from a pipe joint of a fire prevention system in a case of fluid leakage at the joint.

11. The box body according to claim 7, wherein a projection of the cover structure on the wall has a U shape, a V shape, or a rectangular shape.

12. The box body according to claim 7, wherein the condensing part further comprises a flow channel configured to guide a condensate on the cover structure to the one-way gravity valve.

13. The box body according to claim 12, wherein portions of the condensing part on two sides of the flow channel are attached to the wall.

14. The box body according to claim 12, wherein the cover structure is provided with an opening corresponding to the flow channel and configured to guide the condensate on the cover structure to the flow channel.

15. A battery assembly comprising the box body according to claim 1 and the battery accommodated in the box body.

16. An electric apparatus comprising the battery assembly according to claim 15, wherein the battery is configured to supply electrical energy.

17. A method for installing a battery in the box body of claim 1, comprising:
installing the battery on the carrying plate; and
disposing the one-way gravity valve on the carrying plate.

18. A device for installing a battery in the box body of claim 1, comprising:
a first apparatus configured to install the battery on the carrying plate; and a second apparatus configured to dispose the one-way gravity valve on the carrying plate.

19. The box body according to claim 1, wherein the one-way gravity valve further comprises:
a movable assembly installed at the liquid discharge member and configured to move relative to the through hole to:
seal the through hole in response to the gravity of the liquid in the box body being less than the threshold, and
open the through hole in response to the gravity of the liquid in the box body reaching the threshold.

* * * * *